(12) United States Patent
Cai et al.

(10) Patent No.: US 8,401,479 B2
(45) Date of Patent: Mar. 19, 2013

(54) MANAGING INTERFERENCE FROM FEMTOCELLS

(75) Inventors: Ying Cai, Schaumburg, IL (US); Xiang Chen, Rolling Meadows, IL (US); Peilu Ding, Arlington Heights, IL (US); Xiaowei Jin, Palatine, IL (US); Ravindra P. Moorut, Port Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 554 days.

(21) Appl. No.: 12/536,125

(22) Filed: Aug. 5, 2009

(65) Prior Publication Data

US 2010/0035556 A1 Feb. 11, 2010

Related U.S. Application Data

(60) Provisional application No. 61/087,204, filed on Aug. 8, 2008.

(51) Int. Cl.
*H04B 1/00* (2006.01)
*H04B 15/00* (2006.01)
*H04L 12/28* (2006.01)
*H04B 7/00* (2006.01)

(52) U.S. Cl. .................. 455/63.1; 370/254; 455/512

(58) Field of Classification Search .................. None
See application file for complete search history.

(56) References Cited

U.S. PATENT DOCUMENTS

| 5,953,324 | A * | 9/1999 | Adachi ................... 370/331 |
| 7,801,066 | B2 | 9/2010 | Wang et al. |
| 7,848,221 | B2 | 12/2010 | Ding et al. |
| 7,860,521 | B2 | 12/2010 | Chen et al. |
| 2006/0019665 | A1 | 1/2006 | Aghvami et al. |
| 2008/0130620 | A1 | 6/2008 | Liu et al. |
| 2008/0130676 | A1 | 6/2008 | Liu et al. |
| 2008/0139212 | A1 | 6/2008 | Chen et al. |
| 2008/0188265 | A1 * | 8/2008 | Carter et al. ................... 455/561 |
| 2008/0244148 | A1 * | 10/2008 | Nix et al. ................... 710/313 |
| 2009/0135754 | A1 | 5/2009 | Yavuz et al. |
| 2009/0137221 | A1 | 5/2009 | Nanda et al. |
| 2009/0137241 | A1 | 5/2009 | Yavuz et al. |
| 2009/0190500 | A1 * | 7/2009 | Ji et al. ................... 370/254 |
| 2009/0253421 | A1 * | 10/2009 | Camp et al. ................... 455/418 |
| 2009/0288140 | A1 * | 11/2009 | Huber et al. ................... 726/2 |
| 2010/0008259 | A1 * | 1/2010 | Yoon et al. ................... 370/254 |
| 2010/0027694 | A1 * | 2/2010 | Touboul et al. ................... 375/260 |

(Continued)

OTHER PUBLICATIONS

3rd Generation Partnership Project (3GPP), Technical Specification Group Radio Access Networks, Home Node B Radio Frequency (RF) Requirements (FDD), Release 9, Technical Report (TR) 25.967 9.0.0 (May 2009).

(Continued)

*Primary Examiner* — Duc Nguyen
*Assistant Examiner* — Ayodeji Ayotunde
(74) *Attorney, Agent, or Firm* — Stewart M. Wiener

(57) ABSTRACT

A system and method for minimizing interference for mobile devices in a communication network that includes a macrocell base station and a femtocell having a base station. The method receives initialization data on a backhaul connection between the femtocell base station and the macrocell base station, and uses that data to configure the femtocell base station transmitting power. The method receives a user equipment identifier from a macrocell user equipment in the communication network, and determines whether the macrocell user equipment is authorized. If authorized, the macrocell user equipment is granted access to the femtocell base station. If unauthorized, user equipment information for the macrocell user equipment received on the backhaul connection is used to adjust the femtocell base station transmitting power to minimize the interference for mobile devices.

17 Claims, 3 Drawing Sheets

U.S. PATENT DOCUMENTS

2010/0035556 A1    2/2010    Cai et al.
2010/0035628 A1    2/2010    Chen et al.

OTHER PUBLICATIONS

EPC Extended Search Report, RE: Application #09010284.9-2413 Jan. 26, 2010.
"Technical Specification Group Radio Access Networks; 3G Home NodeB Study Item Technical Report (Release 8) V8.1.1." Retrieved from Internet (www.3gpp.org), May 2008, pp. 1-40.
Nortel, et al: "Open and Closed Access for Home NodeBs" 3GPP Draft, Aug. 14, 2007, pp. 1-6.
QUALCOMM Europe: "Restricted Association for HNB's" 3GPP Draft, Nov. 12, 2007, pp. 1-6.
EPC Extended Search Report, RE: Application #09010286.4-2412; Dec. 16, 2009.
3GPP: "3GPP TR 25.967 9.0.0 (May 2009); 3rd Generation Partnership Project; Technical Specification Group Radio Access Networks; Home Node B Radio Frequency (RF) Requirements (FDD) (Release 9)" May 2009, pp. 1-55; XP002558547, pp. 26-32, "7.2 Control of HNB Downlink Interference", in particular, p. 31, "7.2.1.2 Centralized HNB Power Control".
Xiangfang Li, et al, "Downlink Power Control in Co-Channel Macrocell Femtocell Overlay" Information Sciences and Systems, Mar. 18, 2009; pp. 383-388.

Office Action, EPC App. No. 09010286.4-2412, Sep. 2, 2010.
Office Action, EPC App. No. 09010286.4-2412, Aug. 4, 2011.
Office Action, U.S. Appl. No. 12/536,085, Sep. 27, 2011.
Alcatel-Lucent, "Simulation results of macro-cell and co-channel Home NodeB with power configuration and open access", R4-071578, 3GPP TSG-RAN WG4 Meeting #44bis, Shanghai, China, Oct. 2007.
3GPP, "Technical Specification Group Radio Access Networks; 3G Home NodeB Study Item Technical Report (Release 8)", TR 25.820 Version 1.0.0, Nov. 2007.
QUALCOMM Europe, "Simple Models for HomeNodeB Interference Analysis", R4-080409, 3GPP TSG-RAN WG4 Meeting #46, Sorrento, Italy, Feb. 2008.
Claussen, H, "Performance of Macro- and Co-channel Femtocells in a Hierarchical Cell Structure", The 18th Annual IEEE international Symposium on Personal, Indoor and Mobile Radio Communications (PIMRC'07).
Office Action, EPC App. No. 09010284.9-2413, Sep. 24, 2010.
Office Action, EPC App. No. 09010284.9-2413, Aug. 8, 2011.
Ubiquisys LTD., "Femto Cell Radio Resource Management (RRM) and Interference management White Paper," UbiquiSys Ltd., 2007.

\* cited by examiner

MANAGING INTERFERENCE FROM FEMTOCELLS

RELATED APPLICATIONS

This application for letters patent relates to and claims the benefit of U.S. Provisional Patent Application Ser. No. 61/087,204, titled "MANAGING INTERFERENCE FROM FEMTOCELLS", and filed on Aug. 8, 2008; the disclosure of which this application hereby incorporates by reference.

BACKGROUND

In telecommunications, a femtocell, originally known as an Access Point Base Station, is a small cellular base station, typically designed for use in residential or small business environments. The femtocell is a user-deployed home base station (BS) that provides improved home coverage and increases the capacity for user traffic using a backhaul connection to a service provider, such as an Internet Protocol (IP) connection over the user's Digital Subscriber Line (DSL), cable, satellite, fiber-optic, or other high-speed or broadband connection. Current femtocell designs typically support 2 to 4 active mobile phones in a residential setting. Due to co-channel or adjacent-channel operation, it is very challenging to address interference between nearby femtocells or between femtocells and an existing macrocell, that is, a cell in a mobile phone network that provides radio coverage served by a power cellular base station (tower).

The prior art and currently proposed solutions for femtocell interference management assume that femtocells and macrocells are deployed by the same service provider or operator, and provide that power control algorithms on the femtocell side are used to prevent high levels of undesirable interference. However, power adaptation alone cannot solve the interference problem in all scenarios, and such solutions can require a femtocell access point to be equipped with an additional receiver (e.g., a user equipment (UE) type of receiver), which can increase cost and complexity. For example, an additional receiver may be needed for a femtocell BS to detect interference level and path loss information to set up its initial transmitting power.

SUMMARY

Aspects of the present invention provide a system and method for minimizing interference for mobile devices operating in a communication network that includes a macrocell base station and a number of femtocells, each femtocell including a base station. The method receives initialization data on a backhaul connection that connects the femtocell base station and the macrocell base station, and configures the femtocell base station transmitting power based on the initialization data. The method receives a user equipment identifier from a macrocell user equipment in the communication network, and validates the user equipment identifier to determine whether the macrocell user equipment is authorized or unauthorized. When the macrocell user equipment is authorized, the method grants the macrocell user equipment access to the femtocell base station. When the macrocell user equipment is unauthorized, the method receives user equipment information that describes the macrocell user equipment on the backhaul connection, and adjusts the femtocell base station transmitting power based on the user equipment information to minimize the interference for mobile devices in the communications network.

DETAILED DESCRIPTION

Figure 1:
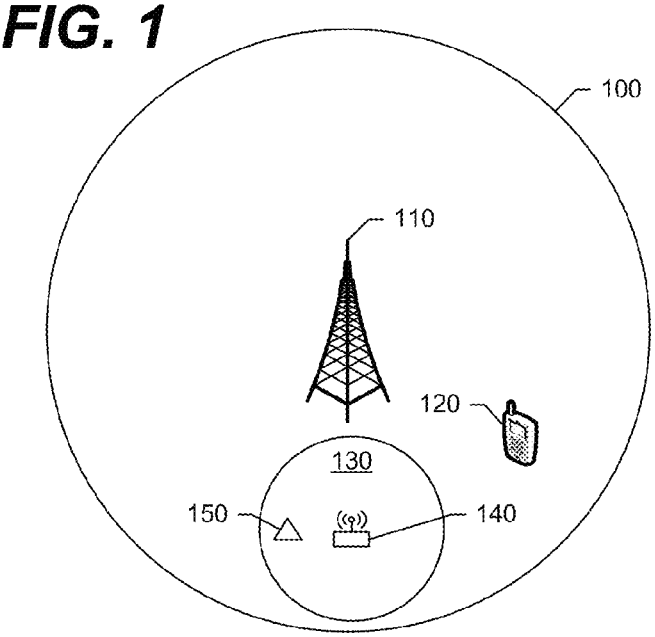
FIG. 1 is network diagram that illustrates one embodiment of the hardware components of a system that performs the present invention.

FIG. 1 is network diagram that illustrates one embodiment of the hardware components of a system that performs the present invention. FIG. 1 shows a macrocell base station (BS) 110 that controls communications in a macrocell 100 coverage range. In one embodiment, the macrocell 100 coverage range is a residential or business area. In another embodiment, the coverage range for the macrocell 100 includes a number of residential or business areas. The macrocell user equipment (UE) 120, such as a mobile telephone or other mobile communication device, communicates voice and data via the macrocell BS 110 with another macrocell UE (not shown) either in the macrocell 100 coverage range or in another macrocell (not shown) coverage range.

The macrocell 100 may include a number, N, of femtocells. Each of the femtocells, such as the femtocell 130 shown in FIG. 1, include a femtocell BS 140 that controls voice and data communications in the femtocell 130 coverage range. The femtocell UE 150 communicates voice and data, via the femtocell BS 140, with another femtocell UE (not shown) in the femtocell 130. Additionally, the femtocell UE 150 communicates voice and data, via the femtocell BS 140 backhaul connection, with the macrocell UE 120, or with another macrocell UE (not shown) either in the macrocell 100 coverage range or in another macrocell (not shown) coverage range.

Figure 2:
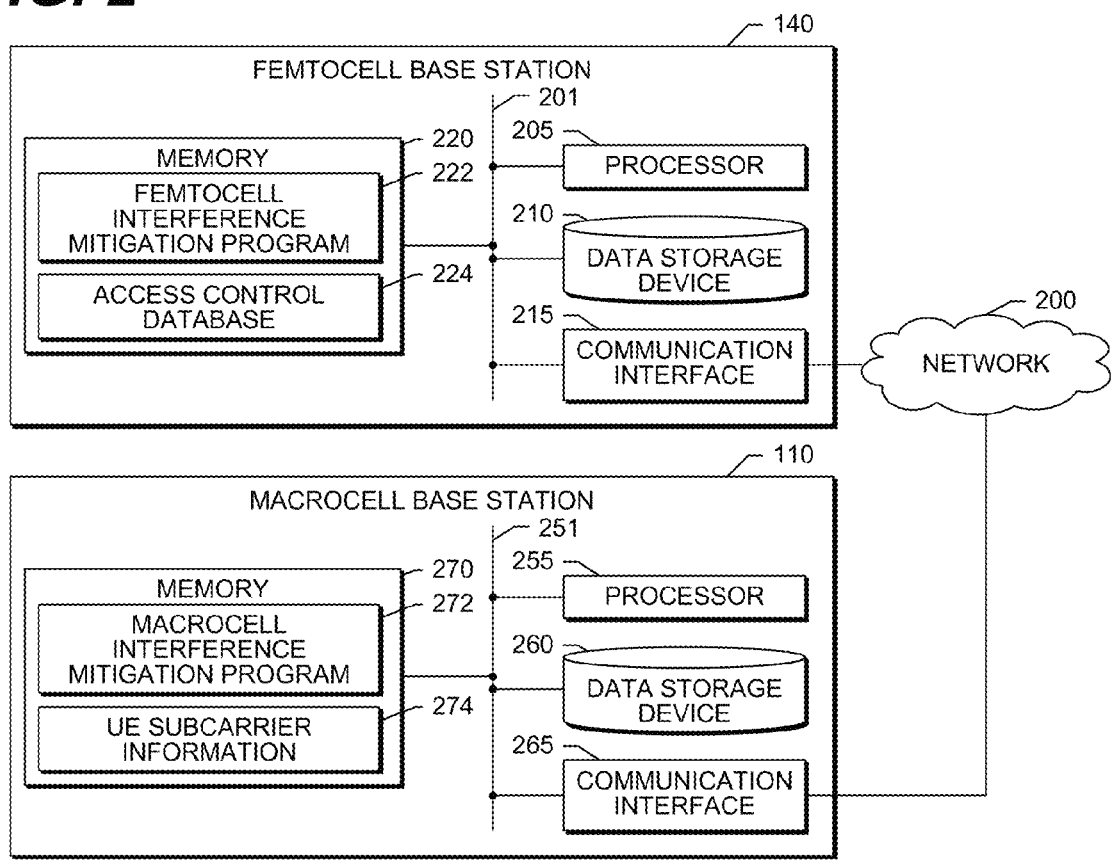
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the femtocell BS 140 and the macrocell BS 110.

The femtocell BS 140 shown in FIG. 2 is a general-purpose computing device that performs the present invention. A bus 201 is a communication medium that connects a processor 205, data storage device 210 (such as a disk drive, flash drive, flash memory, or the like), communication interface 215, and memory 220. The communication interface 215 transmits and receives the data between the femtocell BS 140 and the macrocell BS 110 via the network 200.

The processor 205 performs the disclosed methods by executing the sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the femtocell BS 140 includes a femtocell interference mitigation program 222 and an access control database 224. The femtocell interference mitigation program 222 and access control database 224 perform the method of the present invention disclosed in detail in FIG. 3. When the processor 205 performs the disclosed methods, it stores intermediate results in the memory 220 or data storage device 210. In another embodiment, the memory 220 may swap these programs, or portions thereof, in and out of the memory 220 as needed, and thus may include fewer than all of these programs at any one time.

The macrocell BS 110 shown in FIG. 2 is a general-purpose computing device that performs the present invention. A bus 251 is a communication medium that connects a processor 255, data storage device 260 (such as a disk drive, flash drive, flash memory, or the like), communication interface 265, and memory 270. The communication interface 265 transmits and receives the data between the macrocell BS 110 and the femtocell BS 140 via the network 200.

The processor 255 performs the disclosed methods by executing the sequences of operational instructions that comprise each computer program resident in, or operative on, the memory 270. The reader should understand that the memory 270 may include operating system, administrative, and database programs that support the programs disclosed in this application. In one embodiment, the configuration of the memory 270 of the macrocell BS 110 includes a macrocell interference mitigation program 272 and UE subcarrier information 274. The macrocell interference mitigation program 272 and UE subcarrier information 274 perform the method of the present invention disclosed in detail in FIG. 3. When the processor 255 performs the disclosed methods, it stores intermediate results in the memory 270 or data storage device 260. In another embodiment, the memory 270 may swap these programs, or portions thereof, in and out of the memory 270 as needed, and thus may include fewer than all of these programs at any one time.

The network 200 shown in FIG. 2, in an exemplary embodiment, is a public communication network that connects the femtocell BS 140 and the macrocell BS 110. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

Figure 3:
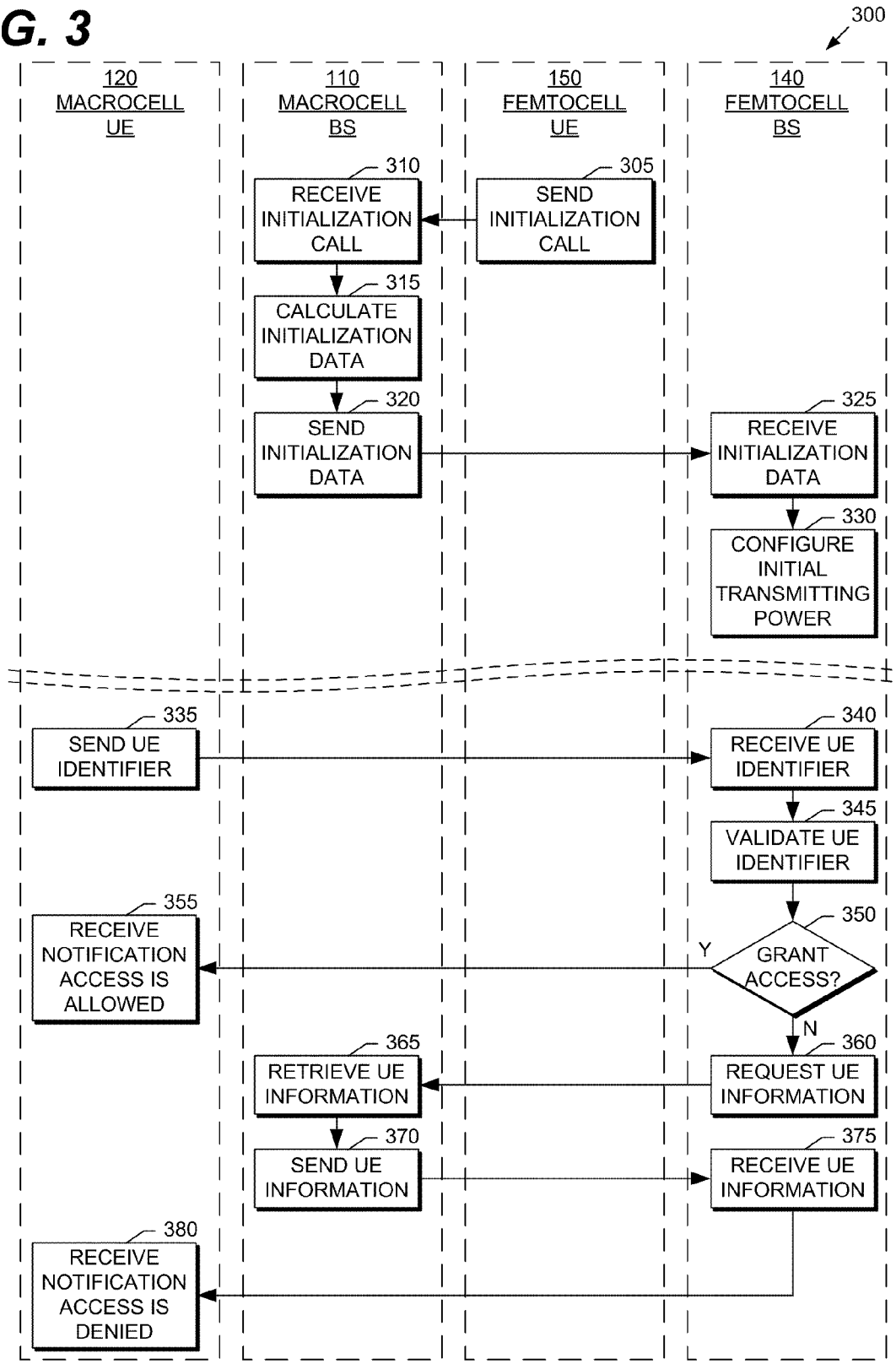
FIG. 3 is a flow chart that illustrates one embodiment of a method for managing interference in a communication network for the present invention.

FIG. 3 is a flow chart that illustrates one embodiment of a method for managing interference in a communication network for the present invention. With reference to FIG. 1 and FIG. 2, the process 300 shown in FIG. 3 begins when the femtocell UE 150 sends an initialization call to the macrocell BS 110 (step 305). After receiving the initialization call (step 310), the macrocell BS 110 uses the initialization call communication messages to calculate initialization data for the femtocell BS 140 (step 315). In one embodiment, the initialization data include an approximation of the path loss and interference level at the femtocell UE 150. The macrocell BS 110 sends the initialization data to the femtocell BS 140 (step 320) on the backhaul connection between the femtocell BS 140 to the macrocell BS 110. After the femtocell BS 140 receives the initialization data (step 325), it uses the initialization data to configure the initial transmitting power for the femtocell BS 140 (step 330).

The process 300 shown in FIG. 3 then continues, when the macrocell UE 120 approaches the femtocell 130. The macrocell UE 120 sends its UE identifier (ID) to the femtocell BS 140 (step 335). The femtocell BS 140 receives the UE ID (step 340) and validates the UE ID (step 345). In one embodiment, the UE ID is the International Mobile Subscriber Identify (IMSI) for the macrocell UE 120. The femtocell BS 140 uses the UE ID to determine whether to grant the macrocell UE 120 access to the femtocell BS 140 (step 350). In one embodiment, the femtocell BS 140 maintains an access control list or database of authorized UEs that it uses to validate that the UE ID is permitted to access the femtocell BS 140. When the femtocell BS 140 recognizes the UE ID for the macrocell UE 120 as an authorized UE (step 350, Y branch), there is no potential for interference between the femtocell BS 140 and the macrocell UE 120. The macrocell UE 120 receives a notification from the femtocell BS 140 that the macrocell UE 120 is allowed to access the femtocell BS 140 (step 355). When the femtocell BS 140 does not recognize the UE ID for the macrocell UE 120 as an authorized UE (step 350, N branch), there potentially may be interference between the femtocell BS 140 to the macrocell UE 120. The femtocell BS 140 uses the backhaul connection to the macrocell BS 110 to request additional UE information that describes the macrocell UE 120 (step 360). The macrocell BS 110 retrieves the additional UE information for the macrocell UE 120 (step 365) and sends the additional UE information via the backhaul connection to the femtocell BS 140 (step 370). After the femtocell BS 140 receives the additional UE information (step 375), the macrocell UE 120 receives a notification from the femtocell BS 140 that the macrocell UE 120 is not allowed to access the femtocell BS 140 (step 380).

Figure 4:
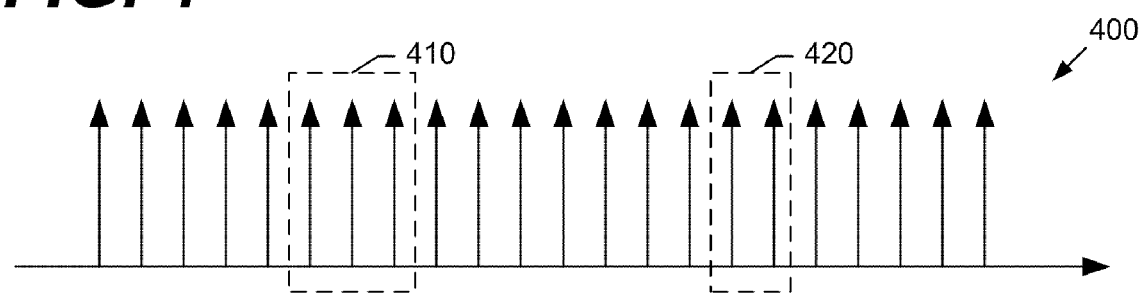
FIG. 4 illustrates one embodiment of a subcarrier assignment for the present invention.

In one embodiment, the femtocell 130 is based on Orthogonal Frequency-Division Multiple Access (OFDMA) technology. The OFDMA technology allows the femtocell BS 140 to also obtain the macrocell UE 120 subcarrier assignment from the macrocell BS 110 with the additional UE information (step 375). FIG. 4 illustrates one embodiment of a subcarrier assignment for the present invention. The subcarriers 400 shown in FIG. 4 include a first group of subcarriers 410 and a second group of subcarriers 420 that are assigned to the macrocell UE 120. As shown in FIG. 4, the first group of subcarriers 410 includes three subcarriers, and the second group of subcarriers 420 includes two subcarriers. To mitigate the interference between the macrocell UE 120 and the femtocell BS 140, the femtocell BS 140 can lower the transmit power over the first subcarrier group 410 and the second subcarrier group 420, while allocating more transmit power to other subcarriers.

In another embodiment, the femtocell 130 is based on Universal Mobile Telecommunication System (UMTS) technology. The UMTS technology allows the femtocell BS 140 to also obtain the macrocell UE 120 target signal-to-noise ratio (SNR), measured SNR, and received power information from the macrocell BS 110 with the additional UE information (step 375). The femtocell BS 140 uses this information adjust the transmit power for the femtocell BS 140, and control the interference with the macrocell UE 120.

In this UMTS embodiment, if the total number of macrocell UEs close to the femtocell BS 140 is N, we define $P_{margin,i}, i \in \{1 \ldots N\}$ as the interference power that macrocell UE i can tolerate. $P_{margin,i}$ can be determined, for example, by:

$$P_{margin,i} = \left( \frac{P_{r,i}}{SNR_{target,i}} - \frac{P_{r,i}}{SNR_{measured,i}} \right) \quad \text{Eqn. (1)}$$

where
$P_{r,i}$ is the received power for macrocell UE i from the macrocell BS 110,
$SNR_{target,i}$ is the target SNR for macrocell UE i, and
$SNR_{measured,i}$ is the measured SNR for macrocell UE i.

In one embodiment, when the femtocell BS 140 is deployed in a home and the macrocell UE 120 is outside the home area, the femtocell BS 140 transmit power can be determined by:

$$P_{Femto} = \min_{i=1 \ldots N} (P_{margin,i}) + P_L \quad \text{Eqn. (2)}$$

where $P_{Femto}$ is the total transmit power for the femtocell BS 140, and $P_L$ is the minimum path loss from the femtocell BS 140 to the macrocell UEs.

In another embodiment, when there are multiple femtocell UEs inside the coverage range of the femtocell 130, the transmit power from the femtocell BS 140 to the femtocell UEs can be determined using a standard UMTS power control algorithm. However, the total transmit power for the femtocell BS 140 cannot exceed $P_{Femto}$.

The various embodiments of the invention described herein can be deployed in a variety of systems, including, by way of example and not limitation, CDMA2000, UMTS and/or LTE (Long Term Evolution) systems, and using any of a variety of channel access methods, for example, Wideband Code Division Multiple Access (WCDMA) and Orthogonal Frequency-Division Multiple Access (OFDMA).

Although the disclosed embodiments describe a fully functioning method for minimizing interference for mobile devices operating in a communication network, the reader should understand that other equivalent embodiments exist. Since numerous modifications and variations will occur to those reviewing this disclosure, the method for minimizing interference for mobile devices operating in a communication network is not limited to the exact construction and operation illustrated and disclosed. Accordingly, this disclosure intends all suitable modifications and equivalents to fall within the scope of the claims.

We claim:

1. A method for minimizing interference for mobile devices operating in a communication network that includes a macrocell base station and at least one femtocell, each femtocell including a base station, the method comprising:
   receiving, by the at least one femtocell base station, initialization data on a backhaul connection that connects the at least one femtocell base station and the macrocell base station;
   configuring, by the at least one femtocell base station, the femtocell base station transmitting power of the at least one femtocell base station based on the initialization data;
   receiving a user equipment identifier from a macrocell user equipment in the communication network;
   validating the user equipment identifier to determine whether the macrocell user equipment is authorized or unauthorized;
   when the macrocell user equipment is authorized to access the femtocell base station,
      granting the macrocell user equipment access to the at least one femtocell base station;
   when the macrocell user equipment is unauthorized to access the femtocell base station,
      receiving user equipment information on the backhaul connection, wherein the user equipment information describes the macrocell user equipment; and
      adjusting, by the at least one femtocell base station, the femtocell base station transmitting power of the at least one femtocell base station based on the user equipment information to minimize the interference for mobile devices in the communications network.

2. The method of claim 1, wherein the receiving of the initialization data further comprises:
   sending an initialization call to the macrocell base station, wherein a femtocell user equipment associated with the al least one femtocell base station sends the initialization call, and
   wherein the initialization data is calculated from based on transmission characteristics of the initialization call.

3. The method of claim 2, wherein the transmission characteristics include path loss and interference level at the femtocell user equipment.

4. The method of claim 1, wherein the user equipment identifier is an International Mobile Subscriber Identify (IMSI) associated with the macrocell user equipment.

5. The method of claim 1, wherein the validating of the user equipment identifier further comprises:
   comparing the user equipment identifier to an access control list,
   wherein when the access control list includes an entry that matches the user equipment identifier, the macrocell user equipment is authorized, otherwise the macrocell user equipment is unauthorized.

6. The method of claim 1, wherein when the femtocell is based on Orthogonal Frequency-Division Multiple Access technology, the adjusting of the femtocell base station transmitting power further comprises:
   receiving subcarrier assignments for the macrocell user equipment; and
   decreasing the femtocell base station transmitting power for the subcarrier assignments for the macrocell user equipment.

7. The method of claim 1, wherein when the femtocell is based on Universal Mobile Telecommunication System technology, the adjusting of the femtocell base station transmitting power further comprises:
   receiving a target signal-to-noise ratio, measured signal-to-noise ratio, and received power for the macrocell user equipment;
   adjusting the femtocell base station transmitting power for a number N of macrocell user equipments, including the macrocell user equipment, as $$P_{margin,i} = \left( \frac{P_{r,i}}{SNR_{target,i}} - \frac{P_{r,i}}{SNR_{measured,i}} \right),$$

wherein:
   $P_{margin,i}$, is an interference power that macrocell user equipment i can tolerate, for $i \in \{1 \ldots N\}$, $P_{r,i}$ is the received power for the macrocell user equipment i, $SNR_{target,i}$ is the target signal-to-noise ratio for macrocell user equipment i, and $SNR_{measured,i}$ is the measured signal-to-noise ratio for macrocell user equipment i.

8. The method of claim 7, wherein when the at least one femtocell base station is in a building and the macrocell user equipment is outside the building, the femtocell base station transmitting power is calculated as $$P_{Femto} = \min_{i=1...N}(P_{margin,i}) + P_L,$$

wherein:
$P_{Femto}$ is a total transmitting power for the at least one femtocell base station, and
$P_L$ is a minimum path loss from the at least one femtocell base station to the macrocell user equipment.

9. A non-transitory computer-readable medium, comprising computer-executable instructions that, when executed on a computer device, perform the method of claim 1.

10. A system for minimizing interference for mobile devices operating in a communication network that includes a macrocell base station and at least one femtocell, each femtocell including a base station, comprising:
a memory device resident in the at least one femtocell base station; and
a processor disposed in communication with the memory device, the processor configured to:
receive, by the at least one femtocell base station, initialization data on a backhaul connection that connects the at least one femtocell base station and the macrocell base station;
configure, by the at least one femtocell base station, the femtocell base station transmitting power of the at least one femtocell base station based on the initialization data;
receive a user equipment identifier from a macrocell user equipment in the communication network;
validate the user equipment identifier to determine whether the macrocell user equipment is authorized or unauthorized;
when the macrocell user equipment is authorized to access the femtocell base station,
grant the macrocell user equipment access to the at least one femtocell base station;
when the macrocell user equipment is unauthorized to access the femtocell base station,
receive user equipment information on the backhaul connection, wherein the user equipment information describes the macrocell user equipment; and
adjust, by the at least one femtocell base station, the femtocell base station transmitting power of the at least one femtocell base station based on the user equipment information to minimize the interference for mobile devices in the communications network.

11. The system of claim 10, wherein to receive the initialization data the processor is further configured to:
send an initialization call to the macrocell base station, wherein a femtocell user equipment associated with the at least one femtocell base station sends the initialization call, and wherein the initialization data is calculated from based on transmission characteristics of the initialization call.

12. The system of claim 11, wherein the transmission characteristics include path loss and interference level at the femtocell user equipment.

13. The system of claim 10, wherein the user equipment identifier is an International Mobile Subscriber Identify (IMSI) associated with the macrocell user equipment.

14. The system of claim 10, wherein to validate the user equipment identifier the processor is further configured to:
compare the user equipment identifier to an access control list,
wherein when the access control list includes an entry that matches the user equipment identifier, the macrocell user equipment is authorized, otherwise the macrocell user equipment is unauthorized.

15. The system of claim 10, wherein when the femtocell is based on Orthogonal Frequency-Division Multiple Access technology, to adjust the femtocell base station transmitting power the processor is further configured to:
receive subcarrier assignments for the macrocell user equipment; and
decrease the femtocell base station transmitting power for the subcarrier assignments for the macrocell user equipment.

16. The system of claim 10, wherein when the femtocell is based on Universal Mobile Telecommunication System technology, to adjust the femtocell base station transmitting power the processor is further configured to:
receiving a target signal-to-noise ratio, measured signal-to-noise ratio, and received power for the macrocell user equipment;
adjusting the femtocell base station transmitting power for a number N of macrocell user equipments, including the macrocell user equipment, as $$P_{margin,i} = \left(\frac{P_{r,i}}{SNR_{target,i}} - \frac{P_{r,i}}{SNR_{measured,i}}\right),$$

wherein:
$P_{margin,i}$ is an interference power that macrocell user equipment i can tolerate, for $i \in \{1 \ldots N\}$,
$P_{r,i}$ is the received power for the macrocell user equipment i,
$SNR_{target,i}$ is the target signal-to-noise ratio for macrocell user equipment i, and
$SNR_{measured,i}$ is the measured signal-to-noise ratio for macrocell user equipment i.

17. The system of claim 16, wherein when the at least one femtocell base station is in a building and the macrocell user equipment is outside the building, the femtocell base station transmitting power is calculated as $$P_{Femto} = \min_{i=1...N}(P_{margin,i}) + P_L,$$

wherein:
$P_{Femto}$ is a total transmitting power for the femtocell base station, and
$P_L$ is a minimum path loss from the at least one femtocell base station to the macrocell user equipment.

* * * * *